United States Patent [19]

Tsuruoka et al.

[11] 3,927,001
[45] Dec. 16, 1975

[54] D-GLUCARO-1,5-LACTAM DERIVATIVES

[75] Inventors: Takashi Tsuruoka; Tomizo Niwa, both of Kawasaki; Uichi Shibata, Tokyo; Shigeharu Inouye; Taro Niida, both of Yokohama, all of Japan

[73] Assignee: Meiji Seika Company Ltd., Japan

[22] Filed: Nov. 12, 1973

[21] Appl. No.: 414,628

[30] Foreign Application Priority Data

Nov. 17, 1972 Japan............................. 47-114735
Nov. 29, 1972 Japan............................. 47-118918

[52] U.S. Cl............................. 260/293.86; 424/267
[51] Int. Cl.²..................................... C07D 211/40
[58] Field of Search............................. 260/293.86

[56] References Cited
OTHER PUBLICATIONS
Niwa et al., J. Biochem. 72, 207–211, (1972).

Primary Examiner—G. Thomas Todd
Attorney, Agent, or Firm—McGlew and Tuttle

[57] ABSTRACT

Novel D-glucaro-1,5-lactam alkyl esters are represented by the general formula,

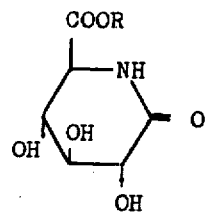

wherein R represents a lower alkyl group. These compounds are strong β-glucuronidase inhibitors which can be easily absorbed in the body by oral administration and are expected to be therapeutical substances for those diseases that induce a high β-glucuronidase activity at the suffered organs. Preparation of said esters comprises either reacting the D-glucaro-1,5-lactam represented by the formula,

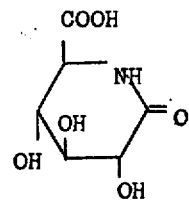

or its inorganic salt or organic amine salt with an alkyl halide represented by the formula,

RX wherein R is a lower alkyl group and X represents a halogen atom, or alkylating the free acid of said lactam using diazoalkane.

5 Claims, No Drawings

D-GLUCARO-1,5-LACTAM DERIVATIVES

BACKGROUND OF THE INVENTION

1. Field of the Invention

This invention relates to new and useful D-glucaro-1,5-lactam alkyl esters. This invention further relates to processes for the production of D-glucaro-1,5-lactam alkyl esters.

2. Prior Art

The D-glucaro-1,5-lactam used as a starting material in the present invention, represented by the formula,

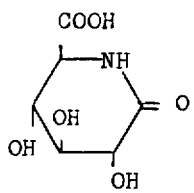

is a compound which can be prepared (see Japanese patent publication No. 28375/1970) from the antibiotic, Nojirimycin (i.e., 5-amino-5-deoxy-D-glucopyranose, see Japanese patent publication No. 760/1968).

D-glucaro-1,5-lactam shown an in vivo inhibitory activity of β-glucuronidase more effective than any other compound that has been previously reported. (see Journal of Biochemistry, 72, 207–211 (1972). Also 2,5-di-O-acetyl-D-glucaro-1,4-6,3-dilactone, a β-glucuronidase inhibitor, suppresses the recurrence of bladder tumor which would undesirably raise β-glucuronidase activity (T. Ichikawa et. al., Journal of Urol., 108, 571–576 (1972)). However, it is highly desirable to improve absorption of the lactam by the body, when said lactam is administered orally. D-glucaro-1,5-lactam is rapidly absorbed when applied intramuscularly or intravenously and intensively suppresses or inhibits β-glucuronidase activity in various organs over a long period of time, but the absorptivity by oral ingestion is less than 20%, as judged by the amount of said lactam excreted in the urine. Furthermore, oral ingestion is the most suitable way to absorb the lactam, since the diseases to be treated with said lactam are treated for long periods of time.

THE OBJECTS OF THE INVENTION

An object of the present invention is to improve the oral absorptivity of the lactam, through oral ingestion of new alkyl esters of said lactam, including methyl, ethyl, n-propyl and n-butyl. A further object is a method for treating diseases in which there is an undesirable rise in β-glucaronidase activity.

Summary of the Invention

D-glucaro-1,5-lactam alkyl esters (or alkyl-5-amino-5-deoxy-D-glucosaccharate-1,5-lactam) of the present invention are shown by the general formula,

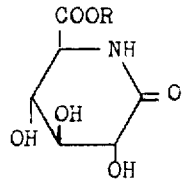

(1)

wherein R is a lower alkyl group, and can be prepared by reacting D-glucaro-1,5-lactam, or its salt, including an inorganic salt such as sodium, calcium, barium, copper or silver salt, or an organic amine salt such as triethylamine salt, with an alkyl halide represented by the formula,

RX wherein R is a lower alkyl group and X is a halogen atom including iodine, bromine or chlorine.

The reaction is carried out in a solvent capable of dissolving the reactants, for example dimethylformamide, dimethylsulfoxide, Dimethylacetamide, dioxane or the like. Dimethylformamide is the most suitable solvent since the lactam can be readily dissolved in it. Though the reaction proceeds even at room temperature, it is preferable that it be carried out at higher temperatures more preferably at temperatures from room temperature to 80°C and most preferably at temperatures from 50 to 60°C, so that a high yield of the desired ester products results.

The reaction mixture may often become acidic as the reaction proceeds. A small amount of a base, for example sodium bicarbonate is preferably added to the mixture prior to the commencement of the reaction for reaction to avoid side reaction caused by an acidic condition in the reaction mixture.

The alkyl esters of the lactam can also be obtained by an alkylation reaction using diazoalkane. The free acid of D-glucaro-1,5-lactam is reacted with diazoalkane in an organic solvent, for example, methanol, dioxane or the like. If an inorganic salt of the lactam, such as the sodium, calcium salt, or the like, is used instead of the free lactam, a mineral acid of equal equivalent to the salt is introduced to the reaction system. All of the reagents and by-products are in solution throughout this reaction process, so that the ultimate product can easily be separated by crystallization from the reaction solution after evaporation.

The esters obtained by the methods of the present invention are novel. When ingested orally, the esters show higher absorptivity or better absorption efficiency than its mother material, D-glucaro-1,5-lactam; the former have remarkable effects on the in vivo supression or inhibition of β-glucuronidase activity. This is considered to be due to the D-glucaro-1,5-lactam formed by the action of an esterase in vivo. As the alkyl esters have no in vitro inhibitory activity of the enzyme, β-glucuromidase, they are regarded as a kind of masked compound.

The absorptivity of the esters of the present invention was examined as follows.

The esters were administered to guinea pigs orally and the total β-glucuronidase inhibitory activity in urine 42 hours after administration was determined to estimate the relative amount of D-glucaro-1,5-lactam in urine. The results are shown below.

Table 1

| Test Compounds | Recovery in urine* |
| --- | --- |
| D-glucaro-1,5-lactam methyl ester | 49.5%** |
| D-glucaro-1,5-lactam ethyl ester | 37.2%** |
| D-glucaro-1,5-lactam n-propyl ester | 43.5%** |
| D-glucaro-1,5-lactam n-butyl ester | 40.7%** |
| Calcium salt of D-glucaro-1,5-lactam | 11.6%** |
| Sodium salt of D-glucaro-1,5-lactam | 13.5%** |

Table 1-continued

| Test Compounds | Recovery in urine* |
|---|---|
| D-glucaro-1,4-lactone | 0.01%*** |
| 2,5-di-Oacetyl-D-glucaro-1,4-6,3-dilactone | 0.2%*** |

*Each of the compounds to be tested was orally administered 1 mM/kg into a group of five guinea pigs, and the urine excreated up to 42 hours after administration was collected and the inhibitory activity of β-glucuronidase in the urine was determined with p-nitrophenyl β-D-glucuronide as the substrate.
**In the form of D-glucaro-1,5-lactam.
***In the form of D-glucaro-1,4-lactone.

It is expected to treat diseases which induce a high β-glucuronidase activity at the diseased organ, for example, bladder tumor with a β-glucuronidase inhibitor. The failure of D-glucaro-1,4-lactone, a well known β-glucuronidase inhibitor (G. A. Lewy, Journal of Biochemistry, 52, 464 (1952); E. Boyland, et. al., Invest. Urol. 36, 563 (1964)), in controlling bladder tumor may be attributed to the extraordinary instability of D-glucaro-1,4-lactone in bladder, as shown in Table 1. As compared with D-glucaro-1,4-lactone, 2,5-di-O-acetyl-D-glucaro-1,4-6,3-dilactone is more effective in the treatment of bladder tumor (T. Ichikawa et. al., Journal. Urol. 108, 571 (1972)). This is accounted for by the high stability of 2,5-di-O-acetyl-D-glucaro-1,4-6,3-dilactone as compared with D-glucaro-1,4-lactam in the in vivo application.

The higher inhibitory activity in urine of the esters of the present invention as compared to 2,5-di-O-acetyl-D-glucaro-1,4-6,3-dilactone and salts of D-glucaro-1,5-lactam, as shown in Table 1 (the β-glucuronidase inhibitory activity of D-glucaro-1,5-lactam is about 16 times that of D-glucaro-1,4-lactone in vitro.), indicated the greater effectiveness in preventing the formation of carcinogenic substances, since many of those compounds are produced from their non-carcinogenic glucuronides by the action of urinary β-glucuronidase. Therefore, it is reasonable to expect that the esters of the present invention are highly effective in the protection of the bladder from tumor growths.

Unexpectedly, another use of the esters of the present invention was demonstrated in the treatment the adjuvant-arthritis of rats.

Table 2 shows the relative effectiveness in the treatment of the adjuvant-arthritis of Sprague-Dowly rats as estimated by the foot-volume in right paw an increase of which was caused by the injection of 0.1 ml of killed mycelia of Mycobacterium butyricum suspended in liquid paraffin (5.8 mg/ml). The compounds to be tested were administered subcutaneously for 10 days successively and the curing effectiveness was estimated by the percent decrease of the initial volume 10 days after injection.

Table 2

| Compounds | Dose/day | Percent decrease of foot volume of adjuvant-arthritis |
|---|---|---|
| D-glucaro-1,5-lactam methyl ester | 5 mg/kg | 28% |
| D-glucaro-1,5-lactam ethyl ester | 5 mg/kg | 23% |
| Aspirin | 100 mg/kg | 26% |
| Untreated control | — | −7% |

The esters of the present invention are of low toxicity. When two groups of 10 mice in each group were orally administered with 4 g/kg of D-glucaro-1,5-lactam methyl ester and D-glucaro-1,5-lactam ethyl ester, respectively, all the mice were still alive a month after the administrations.

The esters of the present invention are orally or intraperitoneally administerable in any pharmaceutical form. Examples of the pharmaceutical form for oral administration include powders, capsules, tablets, syrups, solution and the like.

SPECIFIC EMBODIMENTS OF THE INVENTION

The present invention is now further illustrated with reference to the following Examples but to which the present invention is not limited in any way.

EXAMPLE 1

530 mg of the sodium salt of glucaro-1,5-lactam was placed in a 20 ml-flask equipped with a condenser. 5 ml of dimethylformamide, 0.5 ml of methyl iodide and 100 mg of sodium bicarbonate were added. The resultant mixture was refluxed under agitation at 55°C for 5 hours. The reaction solution was mixed with 10 ml of methanol, and the resultant insoluble component was separated by filtration. The filtrate was evaporated to dryness under reduced pressure. The resultant residue was dissolved in 30 ml of methanol and decolorized with activated carbon powder. The solution was passed through a column of 15 ml of Amberlyst A-15 (H type) at low temperature ( 5° – 10°C ). 30 ml of methanol was further passed through the column for washing. The effluent and the washing were combined together and Amberlite IR-45 (OH type) was added for neutralization. Thus, sodium iodide which was a by-product of the reaction was separated from the solution. The filtrate was concentrated by reducing its volume to about 5 ml, and a precipitate was obtained from said filtrate upon standing at 5°C. The precipitate 460 mg of D-glucaro-1,5-lactam methyl ester in the form of white needle crystal, was collected by filtration. The said precipitate had the following properties Melting point: 182°–184°C (decomposition with bubbling). Elementary analysis (%): C, 41.38; H, 5.42; N, 6.75; O, 47.47. Molecular formula: $C_7H_{11}O_6N$

EXAMPLE 2

9.6 g of D-glucaro-1,5-lactam and 28 g of methyl iodide were dissolved in 120 ml of dimethylformamide, and to the resulting solution 500 mg of sodium bicarbonate was added. The reaction was carried out for 6 hours at 60°C under agitation. The reaction mixture was concentrated to about half of the original volume and was then kept below 5°C for 20 hours. Sodium iodide precipitated was filtered off and the filtrate was concentrated by evaporation to dryness under reduced pressure. The residue was dissolved in 150 ml of methanol and the methanolic solution was concentrated to 80 ml and then allowed to stand at 5°C to obtain a precipitate. The precipitate 6.8 g of D-glucaro-1,5-lactam methyl ester in the form of white needle crystal, was collected by filtration. 6.8 g of D-glucaro-1,5-lactam methyl ester in the form of white needle crystal.

EXAMPLE 3

420 mg of the potassium salt of D-glucaro-1,5-lactam was placed in a 20 ml - flask equipped with a condenser. 5 ml of dimethylformamide and 0.6 ml of ethyl iodide were added and the mixture was refluxed while being stirred at 60°C for 4 hours. The resultant reaction solution was evaporated to dryness under reduced pressure.

The residue was dissolved in 40 ml of distilled water, which was passed through a column of 18 ml of Amberlite 1R-120 (H type) at a temperature of 5° – 10°C, followed by washing with water. The effluent and the washing were combined together and neutralized by means of Amberlite 1R-45 ( OH type ). The resultant solution was evaporated to dryness. The dried residue was dissolved in 4 ml of methanol and decolorized by means of activated carbon, and then allowed to stand to obtain a precipitate. The precipitate, 380 mg of D-glucaro-1,5lactam ethyl ester in the form of white needle crystal, was gathered by filtration. 380 mg of D-glucaro-1,5-lactam ethyl ester in the form of white needle crystal. This precipitate had the following properties:

Melting point: 132° – 134°C (melted) Elementary analysis (%) : C, 43.65; H, 6.28; N, 6.38; O, 43.69.

Molecular formula : $C_8H_{13}O_6N$

EXAMPLE 4

480 mg of the triethylamine salt of D-glucaro-1,5-lactam was placed in a 20 ml-flask equipped with a condenser. 6 ml of dimethylsulfoxide, 0.5 ml of n-butyl bromide and 100 mg of sodium bicarbonate were added and mixed. The mixture was refluxed with agitation at 80°C for 6 hours. The resultant reaction solution was mixed with 10 ml of ethanol. The insoluble component formed in the solution was separated by filtration and the filtrate was evaporated to dryness under reduced pressure. The residue was dissolved in 40 ml of distilled water. The solution was passed through a column of 20 ml of Amberlite 1R-120 ( H type ) and 50 ml of distilled water was further passed through the column for washing. The effluent and the washing were combined together and then neutralized by means of Amberlite 1R-45 ( OH type ), and finally evaporated to dryness. The resultant residue was dissolved in 8 ml of acetone and decolorized with activated carbon powder. Then, ethyl ether was added to the solution to obtain a white precipitate. The precipitate, 350 mg of D-glucaro-1,5-lactam n-butyl ester in the form of white powder, was collected. Said precipitated properties were:

Melting point : 83 - 85°C Elementary analysis (%) : C, 48.75; H, 7.34; N, 5.42; O, 38.49. Molecular formula: $C_{10}H_{17}O_6N$

EXAMPLE 5

1 g of the free acid of D-glucaro-1,5-lactam was dissolved in 50 ml of methanol, and diazomethane gas was introduced into the resulting solution. The resultant reaction solution was allowed to stand at 5°C for 20 hours and concentrated to about 15 ml. The concentrated solution was mixed with ethanol to obtain a precipitate. The precipitate 680 mg of D-glucaro-1,5-lactam methyl ester as white needle crystal, was collected by filtration. The properties of this precipitate were:

Melting point : 182 -184°C (decomposed with bubbling) Elementary analysis (%) : C, 41.23; H, 5.62; N, 6.72; O, 46.43. Molecular formula : $C_7H_{11}O_6N$

EXAMPLE 6

6 g of the free acid of D-glucaro-1,5-lactam was dissolved in 80 ml of dioxane, to the resulting solution was introduced diazomethane gas. The resultant solution was allowed to stand for 10 hours at 10°C. The reaction solution was evaporated to dryness under reduced pressure. The resultant residue was dissolved in 40 ml of methanol and subjected to decolorization treatment with activated carbon powder. The treated solution was concentrated to about 20 ml and allowed to stand at low temperatures to obtain a precipitate. The precipitate 1.3 g of D-glucaro-1,5-lactam methyl ester in the form of white needle crystal, was collected by filtration. 1.3 g of D-glucaro-1,5-lactam methyl ester in the form of white needle crystal.

What we claim is:

1. A D-glucaro-1,5-lactam ester represented by the structural formula,

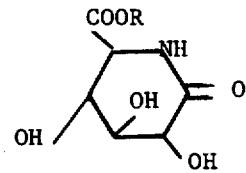

wherein R is selected from the group consisting of methyl, ethyl, n-propyl and n-butyl.

2. Compound according to claim 1, wherein said lower alkyl group is methyl.

3. Compound according to claim 1, wherein said lower alkyl group is ethyl.

4. Compound according to claim 1, wherein said lower alkyl group is n-butyl.

5. Compound according to claim 1, wherein said lower alkyl group is n-propyl.

* * * * *